(12) United States Patent
Post et al.

(10) Patent No.: US 7,902,116 B2
(45) Date of Patent: Mar. 8, 2011

(54) FLUID TREATMENT WITH ACTIVATED CARBON AND CARBON FOAM

(75) Inventors: Isaac Post, Morgantown, WV (US); Thomas M. Matviya, McKees Rocks, PA (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 814 days.

(21) Appl. No.: 11/747,371

(22) Filed: May 11, 2007

(65) Prior Publication Data

US 2008/0064595 A1 Mar. 13, 2008

Related U.S. Application Data

(60) Provisional application No. 60/747,122, filed on May 12, 2006.

(51) Int. Cl.
*C01B 31/08* (2006.01)

(52) U.S. Cl. .................. 502/417; 422/177; 502/416

(58) Field of Classification Search .................. 502/416, 502/417; 422/177
See application file for complete search history.

(56) References Cited

U.S. PATENT DOCUMENTS

| | | | |
|---|---|---|---|
| 6,332,990 B1 * | 12/2001 | Mayer et al. .................. | 252/502 |
| 7,232,790 B2 * | 6/2007 | Tanaka et al. .................. | 502/427 |

* cited by examiner

*Primary Examiner* — Stuart Hendrickson
(74) *Attorney, Agent, or Firm* — Philip D. Lane

(57) ABSTRACT

A system comprising an activated carbon bed in contact with carbon foam is described. In some embodiments, the system, which may be a fluid treatment system, may comprise an activated carbon bed and a carbon foam section covering at least a portion of a surface of the activated carbon bed. In other embodiments, a fluid treatment system may comprise two or more activated carbon beds which are at least partially separated by one or more carbon foam sections. Further embodiments of a fluid treatment system may comprise a vessel, where one or more walls of the vessel comprises carbon foam, and an activated carbon bed contained within the vessel. Still further, a fluid treatment system may comprise an activated carbon bed and a carbon foam section at least partially contained within said activated carbon bed.

6 Claims, 5 Drawing Sheets

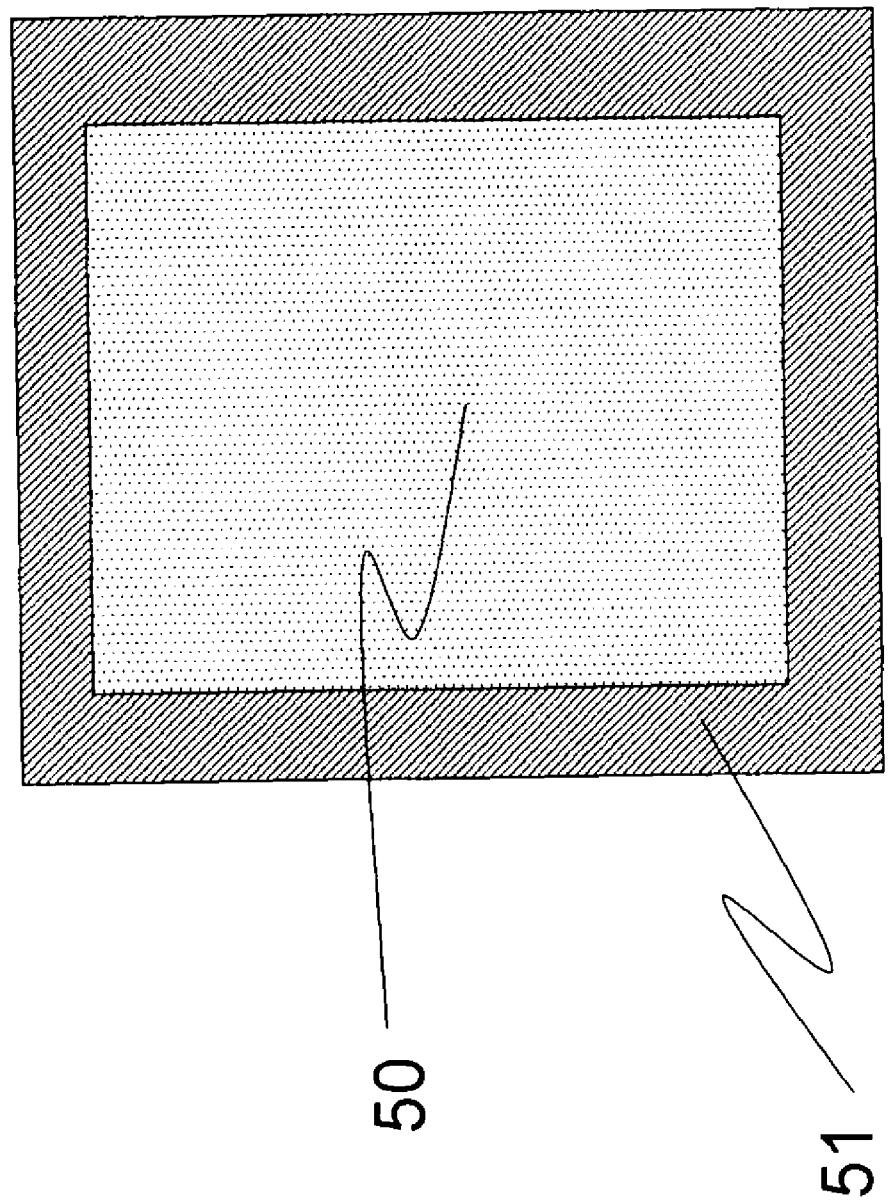

FLUID TREATMENT WITH ACTIVATED CARBON AND CARBON FOAM

CROSS-REFERENCE TO RELATED APPLICATIONS

This application is based on U.S. Provisional Patent Application No. 60/747,122, filed on May 12, 2006, and is herein specifically incorporated by reference in its entirety.

BRIEF SUMMARY OF THE INVENTION

The present invention is directed to a system comprising an activated carbon bed in contact with carbon foam. In some embodiments, the system may be a fluid treatment system may comprise an activated carbon bed and a carbon foam section covering at least a portion of a surface of the activated carbon bed. In other embodiments, a fluid treatment system may comprise two or more activated carbon beds which are at least partially separated by one or more carbon foam sections. Further embodiments of a fluid treatment system may comprise a vessel, where one or more walls of the vessel comprises carbon foam, and an activated carbon bed contained within the vessel. Still further, a fluid treatment system may comprise an activated carbon bed and a carbon foam section at least partially contained within said activated carbon bed.

BRIEF DESCRIPTION OF THE DRAWINGS

FIG. 5 is an illustration of a cross-sectional representation of a system in accordance with a further embodiment of the invention.

DETAILED DESCRIPTION OF THE INVENTION

Figure 1:
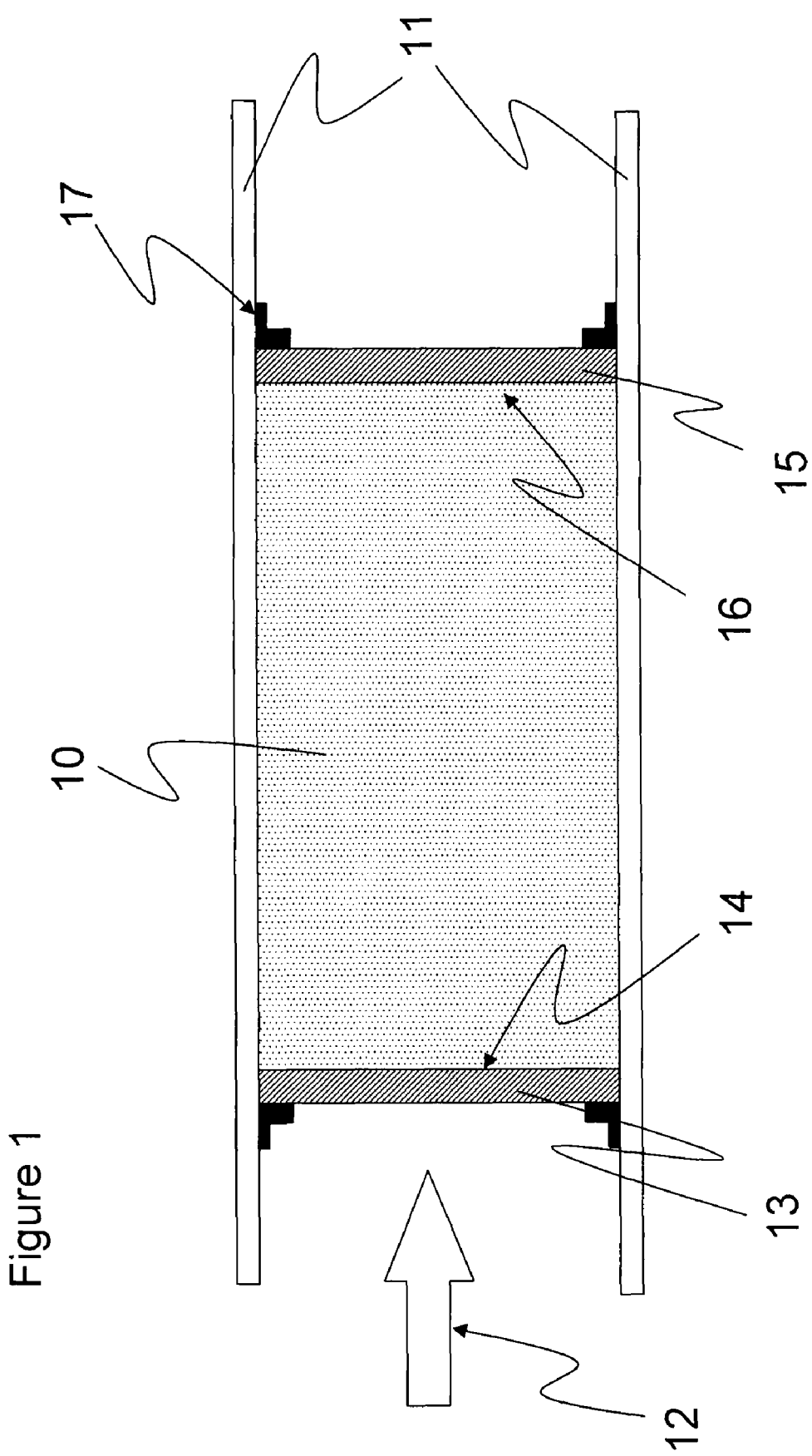
FIG. 1 is an illustration of a cross-sectional representation of a system in accordance with an embodiment of the invention.

Activated carbon is a carbonaceous material characterized as having a large surface area which provides the material with a significant physical adsorption capacity. Activated carbon is commonly used for the treatment of gases and liquids. Such treatment may be for the purposes of purification of such gases or liquids. Such treatment may be also for the separation, concentration, and/or possible recovery of materials, typically of low concentration, from gases and liquids. Activated carbon is commonly available in many forms. Such forms can include pulverized, particulate, shaped bodies, fibers, and fabrics.

In use, the gas or liquid to be treated, which may be collectively referred to as a fluid, is contacted with the activated carbon. For stationary fluids, such contact may be provided by distributing the activated carbon through the fluid. Such distributing is typically practiced with pulverized activated carbon. In other embodiments, for example, the activated carbon may comprise a bed in which the fluid is steeped. For fluids comprising a moving stream, the activated carbon may comprise a bed through which the fluid stream passes. The outer surface of the activated carbon bed through which the stream enters the bed may be referred to as the bed inlet. The outer surface of the activated carbon bed through which the stream exits the bed may be referred to as the bed outlet. Such activated carbon beds may comprise any of the previously mentioned activated carbon forms, either alone or in combination. For example, such beds may comprise particulate activated carbon, including, but not limited to, activated carbon granules, pellets, spheres, and the like. Alternatively, such beds may comprise activated carbon fibers or fabrics. And, as yet another example, activated carbon beds may comprise a shaped activated carbon body. In some embodiments, such shaped activated carbon bodies may be comprised of activated carbon particulates bonded together, for example, by a polymeric material, a carbon char, or fired clay. Such bonding may provide for self supporting shaped activated carbon bodies. Beds of pulverized activated carbon may also be contacted with moving fluid streams, but such practice is typically not common as such beds may exhibit prohibitive pressure drops with respect to the passage of the fluid through the bed at any but the slowest rates.

Carbon foam may be utilized in conjunction with activated carbon beds for the treatment of fluids. The carbon foam may be utilized as one or more sections or pieces. Such sections or pieces may exhibit any geometric shape, such as, but not limited to, panels, rectangular solids, disks, slabs, cylinders, hollow cylinders, and the like. Additionally, such sections may be comprised of one or more individual pieces of carbon foam bonded or otherwise held together by the use of, for example, mechanical means and/or glues, adhesives, cements, and the like. In certain embodiments, the carbon foam may be located on any outer surface of the carbon bed. In some embodiments, the carbon foam may essentially cover the top surface of the activated carbon bed. In other embodiments, the carbon foam may essentially cover the bottom surface of the activated carbon bed. In yet other embodiments, the carbon foam may essentially cover one or more sides of the activated carbon bed. In still other embodiments, the carbon foam may cover at least a part of at least one of the outer surfaces of the activated carbon bed. The location of the carbon foam with respect to the carbon bed may be secured, for example, by mechanical means, gravity, or a pressure differential resulting from the passage of the fluid stream through the carbon foam.

In certain other embodiments, the carbon foam may be located within the activated carbon bed. The carbon foam may essentially divide the activated carbon bed into two or more sections. Alternatively, the carbon foam within the activated carbon bed may not be of sufficient size so as to essentially divide the activated carbon bed into two or more sections. In other embodiments, carbon foam may cover at least a part of at least one of the outer surfaces of the activated carbon bed and also be located at least partially within the activated carbon bed.

Carbon foams suitable for utilization in conjunction with beds of activated carbon may be any of those known carbon foams. Such carbon foams may be produced using any known feedstock and associated processes. The carbon foam may be produced, for example, from pitches, mesophase carbon, mesophase pitches, coal, coal extracts, coal derivatives, hydrogenated coal, hydrogenated coal extracts, carbonizing polymeric resins, and the like, using known carbon foam production procedures. The carbon foam may exhibit a bulk density ranging from about 0.01 g/cc to about 1. g/cc. In some embodiments, the carbon foam may exhibit a bulk density ranging from about 0.01 g/cc to about 0.8 g/cc. Further, the carbon foam may exhibit compressive strengths ranging from about 50 p.s.i. to about 12,000 p.s.i. In some embodiments, the carbon foam may exhibit compressive strengths ranging from about 150 p.s.i. to about 10,000 p.s.i. Suitable carbon foams may exhibit electrical resistivites of less than about 1 ohm-cm. In some embodiments, the ash content of the carbon foam, if present or significant, may be reduced, as desired or required by the application, by acid washing and/or the application of other techniques know to reduce the ash levels of graphites and carbons.

In some embodiments, the carbon foam may be open cell carbon foam. The cell size of the open cell carbon foam may be such that any activated carbon particulates of the activated carbon bed do not readily pass through the carbon foam. In other embodiments, the carbon foam may exhibit a relatively low pressure drop with respect to the passage, at a given rate, of one or more types of fluids through the carbon foam. In still other embodiments, the carbon foam may essentially not leach contaminates into the fluid stream undergoing treatment. In yet other embodiments, the carbon foam may be one piece and may exhibit a sheet-like configuration in that the thickness of the carbon foam is substantially less than the width or length of the carbon foam.

Carbon foam may provide for many beneficial utilities when used in conjunction with activated carbon beds for the treatment of fluids. Some of these utilities may be related to the inherent physical properties of carbon foam, such as, for example, its strength, rigidity, relative chemical inertness, and resistance to elevated temperature. As such, in some embodiments, carbon foam may be utilized in conjunction with activated carbon beds in fluid streams having temperatures and/or corrosive natures that are typically incompatible with many common structural materials. Other utilities may be related to the positioning of the carbon foam with respect to the activated carbon bed. Additionally, carbon foam may be used in conjunction with other materials, particularly those materials that are known to be used for the treatment of fluids.

For example, carbon foam positioned over the bed inlet surface may provide for coarse filtering of the fluid stream. Such positioning of the carbon foam may also serve to provide more uniform distribution of the fluid stream flow to the activated carbon bed and thereby prevent channeling. Furthermore, such positioning of the carbon foam may also serve to reduce expansion of the activated carbon bed, and associated activated carbon attrition, during backwashing. As another example, carbon foam positioned over the bed outlet surface may provide support for the activated carbon bed. Such positioning of the carbon foam may also serve to provide more uniform distribution of the fluid stream flow through the activated carbon bed. Furthermore, such positioning of the carbon foam may also serve to reduce expansion of the activated carbon bed during routine operation, especially at higher fluid flow rates. For positioning at either location, carbon foam, exhibiting an appropriate pressure drop at a given fluid flow rate, may provide for some degree of fluid flow rate regulation.

In other embodiments, carbon foam may be located on a non-inlet or non-outlet surface of the activated carbon bed. Such positioning may provide, for example, fluid by-pass of the activated carbon bed. In other embodiments, such positioning may limit contact of the activated carbon bed with any retaining vessel walls.

In yet other embodiments, carbon foam may act as a support for any of the activated carbon forms discussed above. Carbon foam may also be positioned within an activated carbon bed. When so positioned, the carbon foam may act as at least a partial flow diverter and provide for a more torturous path for fluid flow through the activated carbon bed. In some embodiments, such a torturous path for fluid flow through the activated carbon bed may provide for improved fluid stream treatment. Such positioning may also separate one type, or portion, of activated carbon from another type, or portion, of activated carbon. In other embodiments, suitably placed electrically conductive carbon foam may serve as an electrode through which electrical current may be passed into the activated carbon bed to provide for heating of the activated carbon bed to effect thermal regeneration.

In still other embodiments, the carbon foam may at least partially contain or be at least partially coated with a reactive material that at least partially treats the fluid stream or at least partially prevents degradation of, or enhances, the performance of the activated carbon bed. For example, the carbon foam may be at least partially coated with gold. Such a gold coating may at least partially remove metallic mercury vapors from a gas stream containing such vapors. As another example, the carbon foam may be at least partially coated with silver metal. When positioned over the inlet surface of the activated carbon bed, such silver coated carbon foam may inhibit bacterial growth in the activated carbon bed which sometimes occurs in certain water treatment systems.

Some possible activated carbon bed configurations utilizing carbon foam, and associated beneficial utilities of carbon foam when utilized in conjunction with beds of activated carbon are further illustrated in FIGS. 1 through 5. FIG. 1 provides an illustration of a cross-sectional representation of an activated carbon bed 10 partially contained by walls of a vessel 11. The fluid flow direction through the activated carbon bed is indicated by the arrow 12. A section of carbon foam 13 covers essentially the entire bed inlet surface 14. Another section of carbon foam 15 covers essentially the entire bed outlet surface 16. The sections of carbon foam may be held in place by mechanical means 17. The carbon foam essentially covering the carbon bed inlet surface 14 and outlet surface 16 may provide for many of the previously mentioned beneficial utilities.

Figure 2:
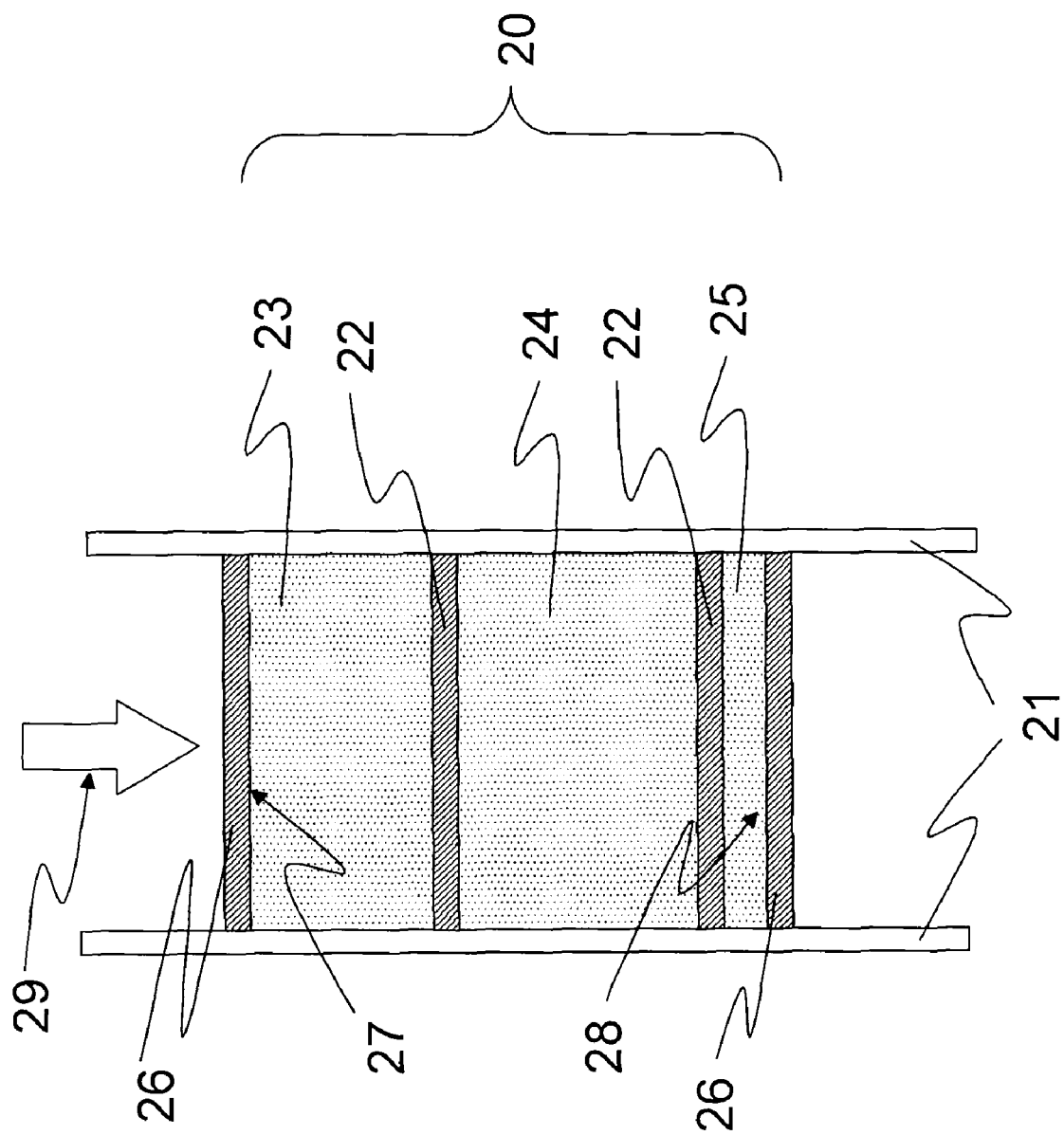
FIG. 2 is an illustration of a cross-sectional representation of a system in accordance with another embodiment of the invention.

FIG. 2 provides an illustration of a cross-sectional representation of an activated carbon bed 20 partially contained by walls of a vessel 21. In this example, the activated carbon bed is comprised of three types of activated carbon separated by sections of carbon foam 22. For example, the activated carbon in one section may be activated carbon pellets 23, the activated carbon in another section may be granular activated carbon 24, and the activated carbon in the remaining section may be activated carbon fibers or cloth 25. Sections of carbon foam 26 cover the bed inlet surface 27 and bed outlet surface 28. The fluid flow direction through the activated carbon bed is indicated by the arrow 29. All the sections of carbon foam shown essentially contact the vessel walls. For any of the embodiments, carbon foam sections may be secured by a number of methods, which may include, but are not limited to using mechanical fasteners, holders, lips on the interior wall surfaces, or other similar devices or arrangements. Fasteners may not be necessary for one or more of the carbon foam sections depending upon the orientation and/or configuration of the vessel. In other embodiments, carbon foam sections may be secured by suitable adhesives, glues, cements, binders and the like. The selection of such adhesives, glues, cements, binders and the like is dependent, among other things, on compatibility with the fluid undergoing treatment and to the physical conditions, such as temperature, of system use. The carbon foam 26 essentially covering the carbon bed inlet surface 27 and outlet surface 28 may provide for many of the previously mentioned beneficial utilities.

Figure 3:
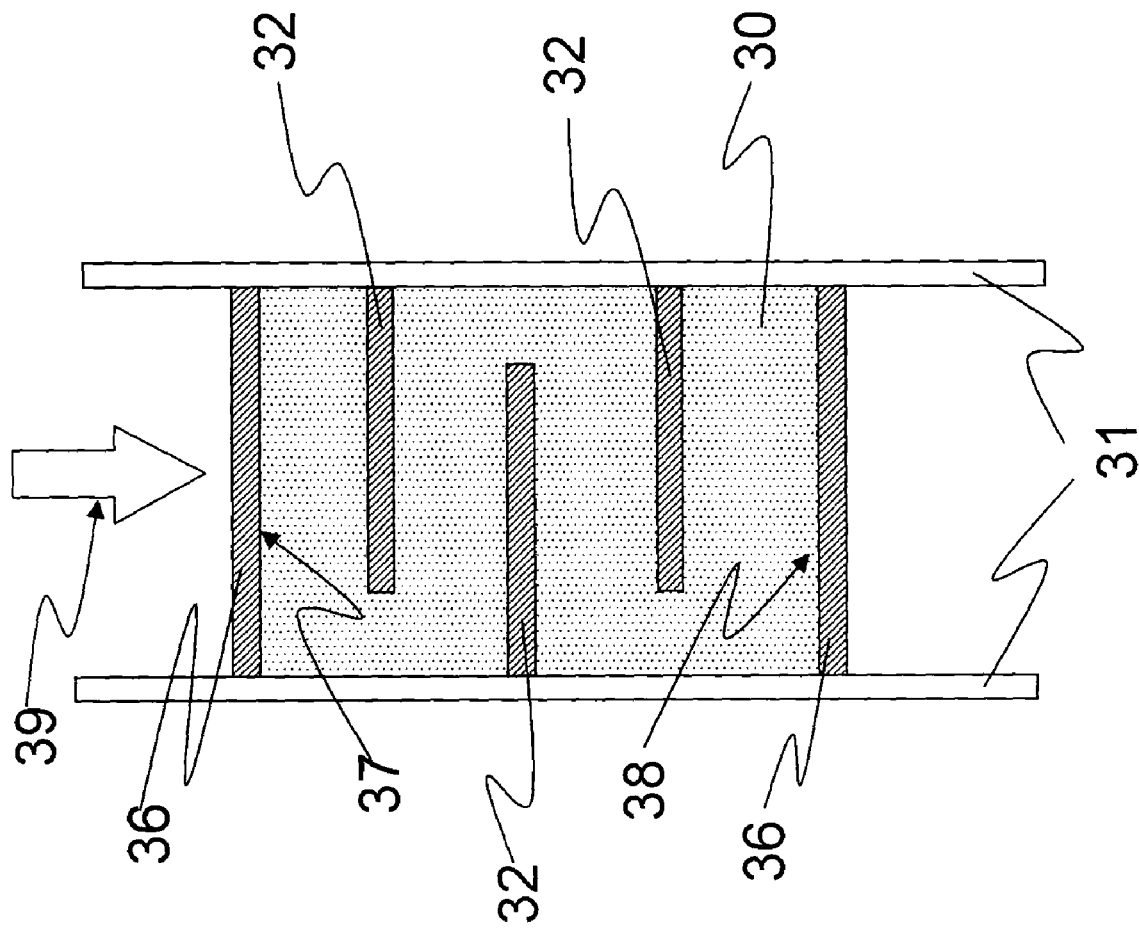
FIG. 3 is an illustration of a cross-sectional representation of a system in accordance with yet another embodiment of the invention.

FIG. 3 provides an illustration of a cross-sectional representation of an activated carbon bed 30 partially contained by walls of a vessel 31. In this example, the activated carbon bed is partially divided by three sections of carbon foam 32. These three sections of carbon foam are of a density or cell size such that fluid flow through the foam is inhibited. Sections of carbon foam 36 cover the bed inlet surface 37 and bed outlet surface 38. The fluid flow direction through the activated carbon bed is indicated by the arrow 39. In this example, the three sections of carbon foam 32 partially dividing the activated carbon bed act as partial flow diverters which provide a torturous path for fluid flow through the activated carbon bed. For any of the embodiments, carbon foam sections may be secured by a number of methods, which may include, but are not limited to using adhesives, binders, cements, glues, mechanical fasteners, holders, lips on the interior wall surfaces, or other similar materials, devices, or arrangements. Securing of the carbon foam sections may not be necessary for one or more of the carbon foam sections depending upon the orientation and/or configuration of the vessel. The carbon foam 36 essentially covering the carbon bed inlet surface 37 and outlet surface 38 may provide for many of the previously mentioned beneficial utilities.

Figure 4:
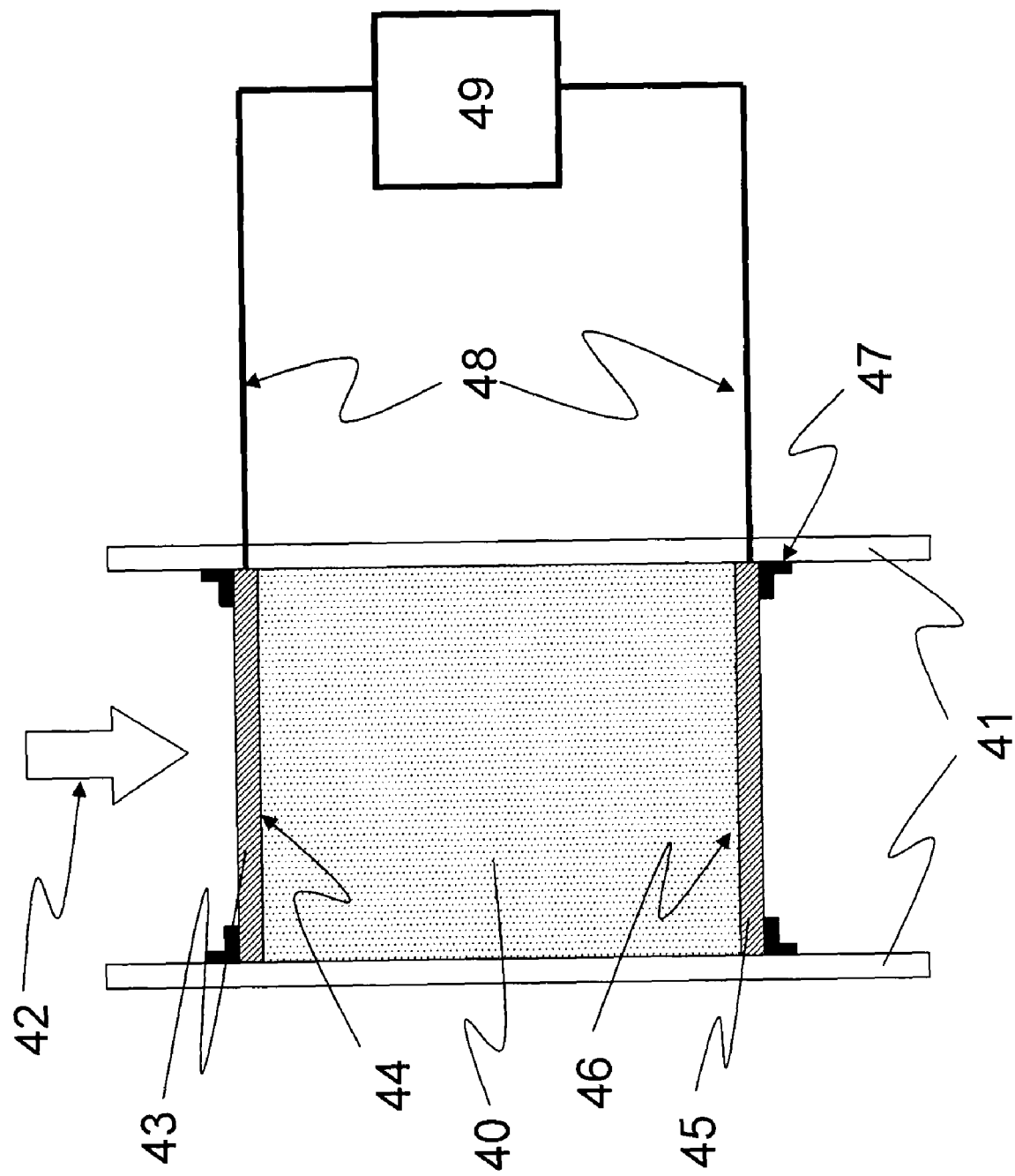
FIG. 4 is an illustration of a cross-sectional representation of a system in accordance with still another embodiment of the invention.

FIG. 4 provides an illustration of a cross-sectional representation of an activated carbon bed 40 partially contained by walls of a vessel 41. The fluid flow direction through the activated carbon bed is indicated by the arrow 42. A section of carbon foam 43 covers essentially the entire bed inlet surface 44. Another section of carbon foam 45 covers essentially the entire bed outlet surface 46. The sections of carbon foam are held in place by mechanical means 47. The vessel walls contacting the activated carbon bed and the carbon foam are essentially electrically nonconductive. The carbon foam sections are electrically connected 48 to a source of electrical power 49. The carbon foam essentially covering the carbon bed inlet surface 44 and outlet surface 46 may provide for many of the previously mentioned beneficial utilities. Additionally, the source of electrical power 49 may be energized, causing an electrical current to pass from the source, through the connections 48, through the carbon foam 43 45, and through the activated carbon bed 40. Electrical current passing through the activated carbon bed may, through the effects of resistive heating, cause the activated carbon bed temperature to increase. This increase in temperature may at least partially regenerate spent activated carbon or at least partially restore the adsorptive capacity of partially spent activated carbon.

FIG. 5 provides an illustration of a cross-sectional representation of an activated carbon bed 50 essentially completely contained by walls of a vessel 51. The vessel walls are comprised of carbon foam. Such a vessel may be immersed in the fluid to be treated. Such immersion may provide for the passage of the fluid through the carbon foam walls 51 and into the activated carbon bed 50 where treatment may occur. Following treatment, the vessel may be removed from the fluid and the adsorptive capacity of the activated carbon regenerated by conventional methods. Such conventional methods may be applied to only the activated carbon in the vessel. In other embodiments, the entire vessel may be subject to regeneration conditions.

Several embodiments of the invention have been described in detail to provide an understanding of various aspects of the invention. The invention is not limited by these particular embodiments and can have a wide range various embodiments. The invention is only limited by the appended claims.

What is claimed is:

1. A system comprising a vessel having a fluid inlet and a fluid outlet, an activated carbon bed positioned within the vessel, and carbon foam covering at least a portion of a surface of the activated carbon bed.

2. The system of claim 1, wherein at least one section of carbon foam separates the activated carbon bed into at least two activated carbon beds.

3. The system of claim 1, wherein at least a portion of the vessel comprises carbon foam.

4. The system of claim 1, wherein the carbon foam is at least partially contained within said activated carbon bed.

5. The system of claim 1, wherein the carbon foam has a density ranging from about 0.01 g/cc to about 1. g/cc.

6. The system of claim 1, wherein the carbon foam has a density ranging from about 0.01 g/cc to about 0.8 g/cc.

* * * * *